UNITED STATES PATENT OFFICE.

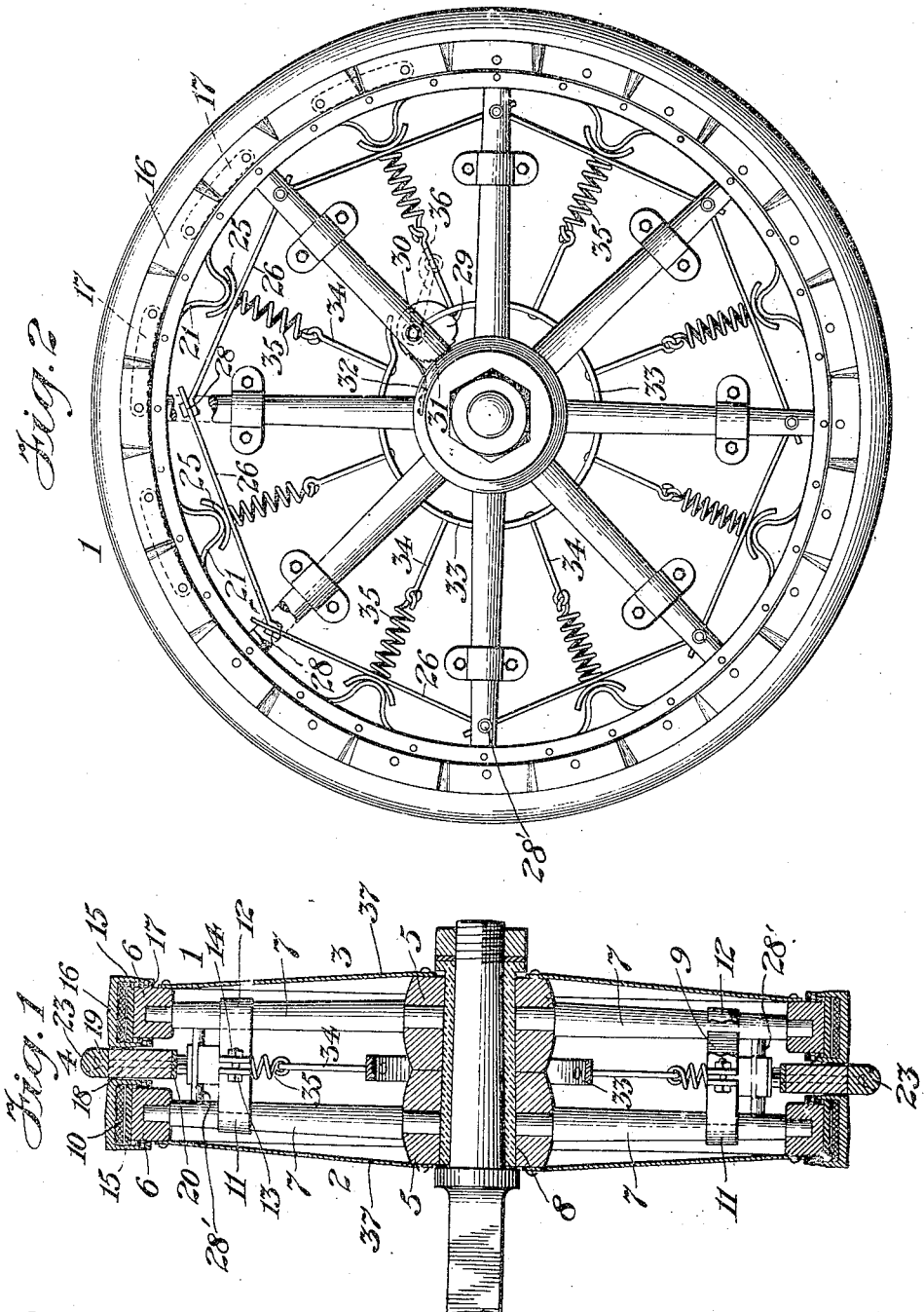

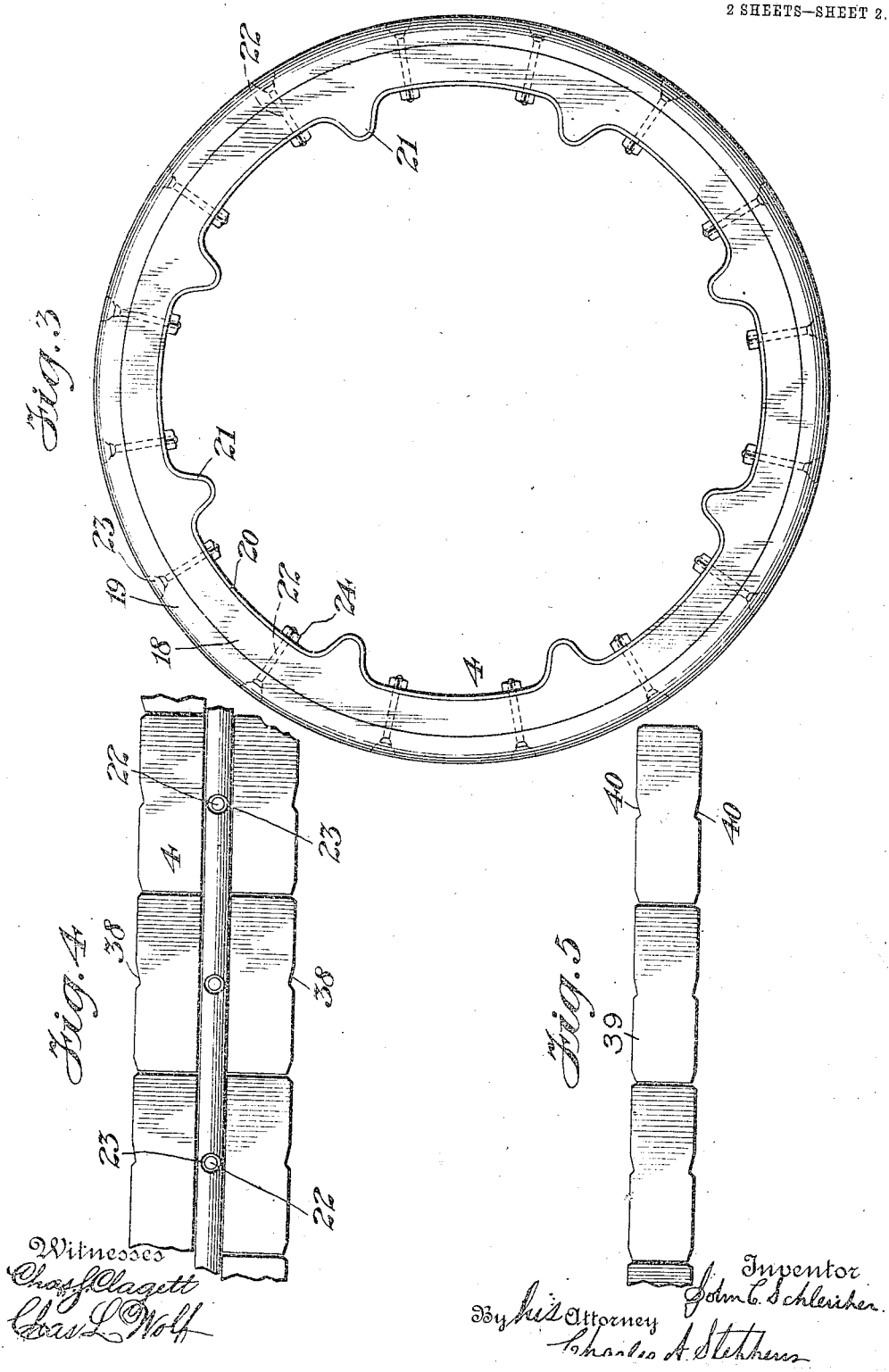

JOHN C. SCHLEICHER, OF MOUNT VERNON, NEW YORK.

VEHICLE-WHEEL.

No. 816,189.

Specification of Letters Patent.

Patented March 27, 1906.

Application filed February 23, 1905. Serial No. 246,824.

*To all whom it may concern:*

Be it known that I, JOHN C. SCHLEICHER, a citizen of the United States, and a resident of Mount Vernon, in the county of Westchester and State of New York, have invented certain new and useful Improvements in Vehicle-Wheels, of which the following is a specification.

My invention relates to vehicle-wheels, particularly to a wheel adapted to serve as an automobile-wheel or as a wheel for heavy vehicles.

It has for its object to provide a wheel comprising two side wheels rigidly connected together so as to leave a space between their fellies, said wheels having continuous tires on their fellies, sectional linked outer tires and cushions interposed between the inner and outer tires, and an intermediate wheel yieldably supported between the other wheels and having means for regulating the yielding of said wheel.

It has for a further object to provide a wheel of the character set forth embodying advantages in point of strength, durability and simplicity, and inexpensiveness of construction.

In the drawings, Figure 1 is a sectional view of my device; Fig. 2, a side view; Fig. 3, a fragmentary side view of the wheel, showing the wheel-fellies and tires. Fig. 4 is a fragmentary plan view showing portions of the tires of the wheel; Fig. 5, a fragmentary plan view of a modified form of tire for a single wheel, showing the rail-engaging notches on both side edges thereof.

Corresponding parts in all the figures illustrating my invention are designated by the same reference characters.

Referring to the drawings, 1 designates the wheel as a whole, which is constructed of two side wheels 2 and 3 and an intermediate wheel 4.

Each side wheel is provided with the usual hub 5, felly 6, and spokes 7, the ends of the hubs abutting so that their bores 8 will be continuous and a space being left between the fellies. The wheels are securely connected together by blocks 9, interposed between adjacent spokes of the wheels and held in place by straps 11 and 12, embracing the blocks and having their ends connected together by bolts 13 and nuts 14. Each side wheel is provided with a steel tire 15, secured to the felly, its edges projecting beyond the felly, an outer tire 16 comprising inverted-U-shaped steel sections, the downwardly-projecting side portions of said sections embracing the felly and projecting below the tire 15, and links 17 are pivotally connected to the ends of the sections on the inside just below the tire 15, and thereby hold the sectional tire in place, and a circular rubber cushion 10 is interposed between the inner and outer tires adapted to take the jar of the outer tire.

The felly 18 of the intermediate wheel is located between the fellies of the side wheels and is provided on its outer face with a tire 19, having a rounded tread, and a steel band 20 on its under face having inwardly-projecting portions 21 located between the spokes, said tire and band being secured to the felly by bolts 22 passing therethrough and through the felly, the heads being countersunk in holes 23 of the tire and the ends having nuts 24 thereon. The projections of the band rest upon curved seats 25, supported on spring-plates 26, mounted between the spokes, one end of each plate having a slot 28 and journals 28' engaging bearings in parallel spokes of the side wheels and the other end being slidably supported in the slot 28 in the end of the adjacent plate 26. A ratchet-wheel 29 is eccentrically secured on an axle 30, mounted between two of the oppositely-located spokes of the side wheels, and its teeth 31 are engaged by a spring-pawl 32, secured to the hub of one of the side wheels. One end of a spring-band 33 is secured to the axle 30 and the other end projects upwardly and rests on the periphery of the ratchet-wheel 29. The lower ends of the radial rods 34 are secured to the spring-band 33 and the other ends support the lower end of a spiral spring 35, the upper end of which supports the spring-plates 26 beneath the seats 25 thereon.

It will be understood from the construction of this intermediate wheel that when it is supporting a load the jar from contact with a track or other object will be taken up by the spring-plates 26 and springs 35 and that the tension of the supporting-springs 35 is regulated by means of the eccentrically-mounted wheel being turned by a handle 36 on its axis to effect the raising or lowering of the end of the spring-band 33, and thereby the expansion or contraction of said band, which in turn expands and contracts the springs 35.

To protect the parts of the wheel from dust, dirt, or water, a circular plate 37 is secured on each side. To provide means for the easy engagement of the tires of the side wheels with railroad-tracks when by reason of a heavy load the vehicle is running on said wheels, notches 38 are made in the outside edges.

Referring now to the modification shown in Fig. 5, this tire 39 only differs from the other tires in that on account of being for a single wheel it is provided with notches 40 in each edge. The rounded tread of the tire of the intermediate wheel adapts it to run in the slots or tracks or serve as a flange to hold the wheels on any ordinary T-rail.

It will be understood from the foregoing that on account of the intermediate wheel being yieldingly supported between the side wheels on the spring-plates 26 and springs 35, by reason of the projecting portions 21 on said intermediate wheel seating in said curved seats 25 on said plates 26, when a vehicle supplied with my wheels is supporting a light load the intermediate tire will support the entire weight and present a narrow tread, that when supporting a heavy load the intermediate wheel will be forced in so that the side wheels will aid in supporting the load and present a wide tread, and that when the side wheels are running on a T-rail the intermediate wheel will form a flange to engage the side of said rail and prevent the wheel slipping off, thus making it possible for a vehicle supplied with my wheels to ride on railroad-tracks and be guided thereby.

I do not herein claim the tire feature, as it has been made the subject of a divisional application hereof.

I do not wish to be understood as limiting myself to the precise details and arrangements of parts shown and described, but reserve the right to all modifications within the scope of my invention.

Having now described my invention, what I claim as new, and desire to secure by Letters Patent, is—

1. A vehicle-wheel comprising two side wheels, a wheel located between said side wheels and having a band secured to its under face provided with projections, spring-plates carried on the spokes of the side wheels, seats on said plates engaged by the projections of the band, an eccentrically-mounted ratchet-wheel, a pawl engaging it, a spring-band adapted to be expanded and contracted by said ratchet-wheel and springs supported between said spring-band and spring-plates, substantially as described.

2. A vehicle-wheel comprising two side wheels, a wheel located between said side wheels and having a band secured to its under face provided with projections, spring-plates carried on the spokes of the side wheels and engaged by the projections of the band, an eccentrically-mounted ratchet-wheel, a pawl engaging it, a spring-band adapted to be expanded and contracted by said ratchet-wheel and springs supported between said spring-band and spring-plates, substantially as described.

3. A vehicle-wheel comprising two side wheels, a wheel located between said side wheels and having a band secured to its under face provided with projections, spring-plates carried on the spokes of the side wheels and engaged by the projections of the band, an eccentrically-mounted ratchet-wheel, a pawl engaging it, a spring-band adapted to be expanded and contracted by said ratchet-wheel and yieldable means supported between said spring-band and spring-plates, substantially as described.

Signed at New York, in the county of New York and State of New York, this 18th day of February, A. D. 1905.

JOHN C. SCHLEICHER.

Witnesses:
CHAS. L. WOLF,
M. BENDER.